E. S. WOODS.
ANTIFRICTION BEARING.
APPLICATION FILED DEC. 10, 1908.

979,120. Patented Dec. 20, 1910.

2 SHEETS—SHEET 1.

Witnesses:
F. H. Alfreds
G. R. Wilkins

Inventor
Edwin S. Woods
by Poole & Brown Attys

THE NORRIS PETERS CO., WASHINGTON, D. C.

E. S. WOODS.
ANTIFRICTION BEARING.
APPLICATION FILED DEC. 10, 1908.

979,120. Patented Dec. 20, 1910.

2 SHEETS—SHEET 2.

Witnesses:
F. H. Alfreds
G. R. Wilkins

Inventor
Edwin S. Woods
by Poole & Brown
Attys

THE NORRIS PETERS CO., WASHINGTON, D. C.

UNITED STATES PATENT OFFICE.

EDWIN S. WOODS, OF CHICAGO, ILLINOIS.

ANTIFRICTION-BEARING.

979,120. Specification of Letters Patent. Patented Dec. 20, 1910.

Application filed December 10, 1908. Serial No. 466,751.

*To all whom it may concern:*

Be it known that I, Edwin S. Woods, a citizen of the United States, and a resident of Chicago, in the county of Cook and State of Illinois, have invented certain new and useful Improvements in Antifriction-Bearings; and I do hereby declare that the following is a full, clear, and exact description thereof, reference being had to the accompanying drawings, and to the letters of reference marked thereon, which form a part of this specification.

This invention relates to improvements in antifriction bearings, and the invention consists in the matters hereinafter set forth and more particularly pointed out in the appended claims.

The invention is herein shown as embodied in a type of bearing constructed and arranged to be applied as a side bearing for railway cars, but certain features of the invention are applicable to bearings for other uses, as for instance, center bearings for railway cars and the like, as will hereinafter appear.

Figure 1:
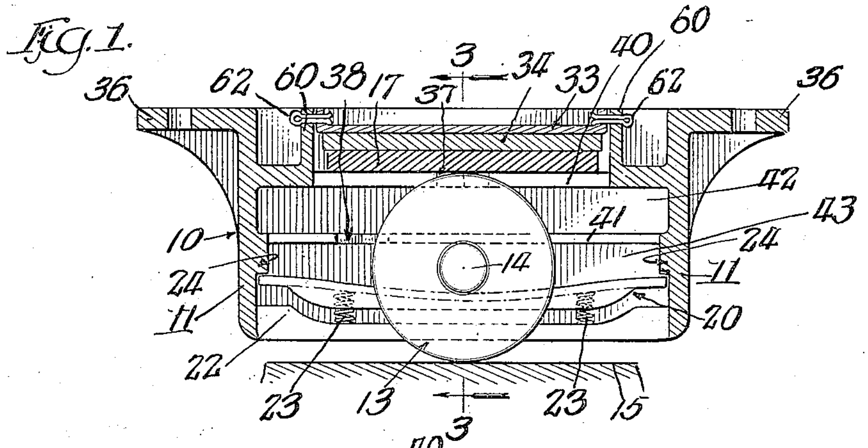
Figure 2:
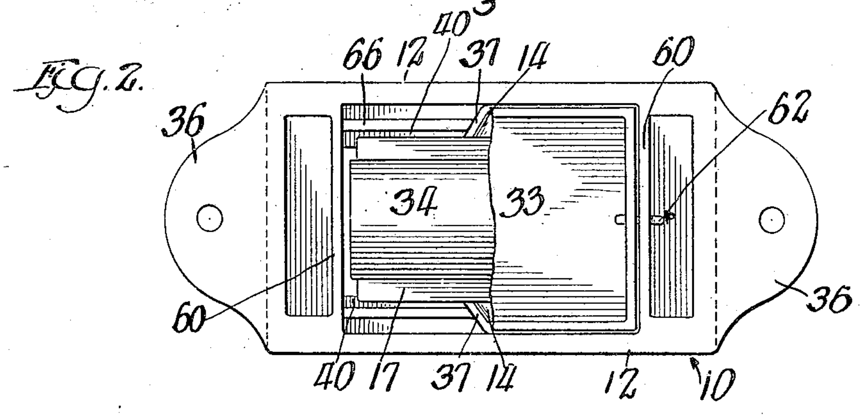
Figure 3:
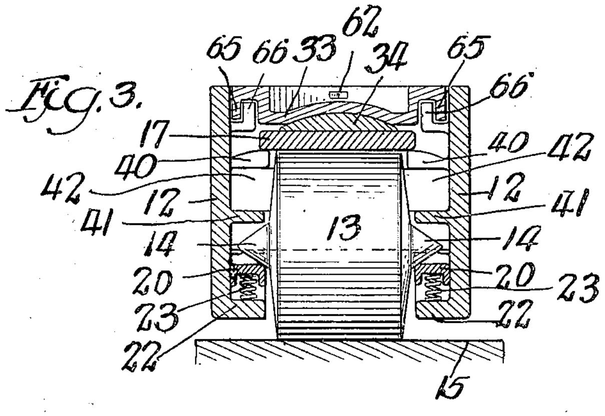
Figure 4:
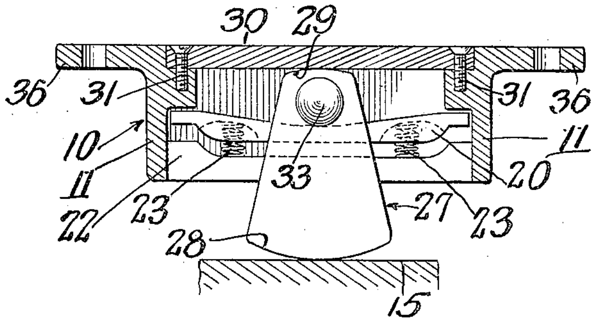
Figure 5:
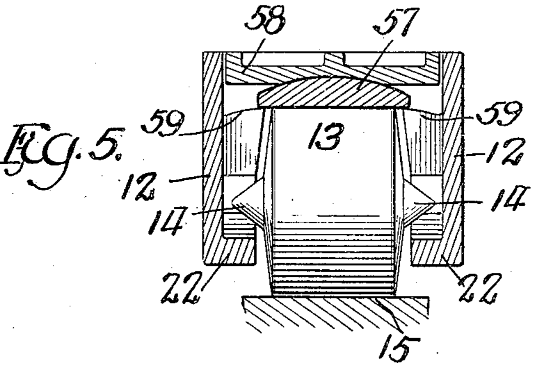
Figure 6:
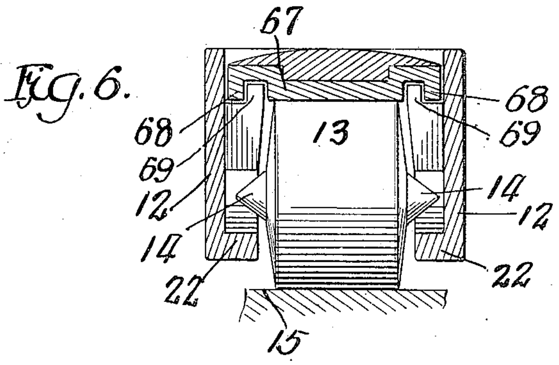

In the drawings:—Figure 1 is a section of an antifriction bearing embodying my invention, taken longitudinally through the carrier or casing. Fig. 2 is a plan view thereof, partially broken away, to illustrate the construction beneath. Fig. 3 is a transverse section on line 3—3 of Fig. 1. Fig. 4 is a longitudinal section of a modified form of bearing. Fig. 5 is a transverse section illustrating another modification. Fig. 6 is a transverse section illustrating a still further modification.

The antifriction bearing herein illustrated is of that type wherein the antifriction element, as a roller or rocker, is provided with oppositely extending trunnions or end bearings by which the antifriction element is supported on tracks or ledges in the carrier when said antifriction element is out of contact with the upper and lower bearing surfaces, and in which the tracks are so arranged as to automatically bring the roller, when free, to a central or other desired position in the carrier. The application of the several features of my invention will be hereinafter specifically described with respect to this type of bearing, but the following description is not intended to impose limitations upon the general application of the invention, certain features of which are applicable to other forms of antifriction bearings for this and analogous uses.

The carrier 10 of the bearing comprises end walls 11, 11 and side walls 12, 12 which inclose a chamber in which is located the antifriction element 13, herein shown as having the form of a cylindric roller provided with end bearings or trunnions 14, 14 adapted for engagement with tracks on the side walls of the casing. The carrier is open at its lower side and the roller projects therethrough for engagement with a lower bearing 15. When the device is employed as the side bearing for railway cars the carrier will usually be attached to and depend from the body bolster, and the upwardly facing bearing member 15 will be attached to the truck bolster. The upper bearing member, which the roller engages when the load is transmitted therethrough, comprises a wear plate or member 17 suitably supported in the upper wall of the carrier.

20, 20 designate tracks, arranged longitudinally one at each side of the carrier for engagement with the trunnions or end bearings of the antifriction element 13. Heretofore such tracks have been made stationary with, or integral parts of, the side walls of the carrier and located at such distance from the upper bearing member 17 that when the antifriction element is free from the upper and lower bearing members, it drops downwardly with its trunnions resting on the tracks. This construction has been criticised, especially in passenger car work, because of tendency of the parts to rattle when the roller or antifriction element is free. In order to overcome this objection, said tracks may have the form of bars 20 which are movable relatively to the carrier, and may be placed under the influence of suitably located resilient means, as springs, which act through the track bars and the trunnions to hold the antifriction element up against the upper bearing member when said antifriction element is free from the lower bearing member. The construction herein illustrated embodying this feature of the invention is most clearly shown in Figs. 1, 3 and 4 and is made as follows: The track bars 20 lie along the inner faces of the side walls of the carrier above flanges or shoulders 22 which extend inwardly from the lower margins of said side walls. The said track bars 20 are yieldingly supported on the flanges 22 through the medium of springs 23, shown as having the form of spiral expansively acting springs. Each track bar is inserted into the carrier through the upper or lower open side thereof and is passed laterally into place. Preferably the end walls 11 of the carrier are provided with thickened portions or lugs 24 beneath which the ends of the track bars extend and which limit the upward movement thereof under the action of the springs 23. In the present instance the said track bars 20 are inclined inwardly and downwardly on their upper faces so as to permit the roller, when free from the lower bearing 15, to roll by gravity to the central position indicated in Fig. 1, or to any other position within the carrier as desired. The force exerted by resilient means, as the springs 23, is applied in such a way as to assist gravity to return the antifriction element, as the roller, to its central or other position in the carrier when free from contact with the lower bearing member. The under sides of said track bars are grooved or otherwise cut away to receive the springs 23.

In Fig. 4 I have shown this feature of the invention applied to a bearing in which the antifriction element has the general form of the segment of a cylinder; it having a lower bearing arc 28 for engagement with the lower bearing member 15 and an upper shorter bearing arc 29 for engagement with the bearing member 30 therein shown. Said arcs may or may not be struck from the same radius. The carrier is open at its top to receive the antifriction element 27 and the bearing member or wear plate 30 comprises a flat steel bar which is removably fitted in the upper part of the carrier to constitute the top wall thereof, as herein shown. The top of the carrier may be recessed to receive the wear plate or bearing member 30 to bring its upper face flush with the upper face of the attaching lugs 36 at the ends of the carrier. By this arrangement the wear plate may be held in place between the carrier and the support, as a car bolster, to which it is attached. If desired, screws 31 may extend through the wear plate into the end walls to temporarily hold the wear plate in place before it is applied to the bolster or other support and thereby hold the parts of the bearing assembled. The antifriction element 27 has trunnions 33 which are engaged with the yielding track bars 20, through the medium of which latter the antifriction member is held up against the upper bearing member or wear plate 30. The means for holding the antifriction element against one of the bearing members may be applied to other forms of antifriction elements.

The parts which constitute the upper wall of the carrier are, in the construction shown in Figs. 1 to 3, removable, and when said parts are removed an opening is provided in the top of the carrier through which the antifriction element 13 may be inserted into and removed from the carrier. The said removable top wall of the carrier comprises, in the present instance, the wear plate 17, a filler plate 33 and an interposed member 34, the function of which latter is hereinafter described. Said parts may be held in place, when the carrier is attached to a bolster or other supporting part, (as by means of bolts passing through the attaching lugs 36 at the ends thereof) between the carrier and the part to which the carrier is attached. When the carrier is thus open at its top to receive the antifriction member it may be provided in its side walls with notches through which the trunnions of the antifriction member pass when the latter is being inserted into or removed from the carrier. In accordance with one feature of my invention, the said notches lead indirectly from the open side of the carrier to the tracks, each notch comprising upper and lower parts 37, 38, respectively, arranged vertically out of line with each other and horizontally connected, as most clearly shown in Fig. 1. That is to say, the upper parts of the trunnion receiving notches may be located near the longitudinal center of the carriage while the lower parts 38 thereof may be located adjacent to one end of the carrier.

In the construction shown in Figs. 1 to 3, inclusive, the side walls of the carrier are cored out to lighten the same, and are formed with upper and lower strengthening and wear ribs 40, 41. Between said upper and lower ribs are formed channels 42, and between the lower ribs and the track bars 20 are formed other channels 43, which latter correspond to the usual channels in this general type of bearing as heretofore constructed, and into which the trunnions extend.

When the carrier is constructed as described, the upper part 37 of the trunnion receiving notch at each side of the carrier is formed through the upper rib 40 of the side wall and the lower part 38 of said notch is formed through the lower rib 41 of said wall. The channels 42 constitute horizontal connections between the upper and lower offset parts of the notches. When the trunnions or end bearings are tapered, as herein shown, the vertical portions of the notches may be made V-shaped, as shown in Figs. 1 and 2.

When inserting the antifriction element into the carrier the trunnions 14 will first pass through the upper or centrally located parts 37 of the trunnion notches until the trunnions are brought to the level of the channels 42. Thereafter the said antifriction member is shifted endwise of the carrier until the trunnions are brought into line with the lower parts 38 of the notches, after which the antifriction member is free to pass to its position in the carrier with the trunnions occupying the lower channels 43. Obviously, the same results will be obtained by locating the two parts of the notch of each wall at different distances from the end wall or at different relative distances from each other so long as said parts are out of line and the trunnions of the antifriction element may pass therethrough. The purpose of arranging the upper and lower parts of the notches out of line with each other is to avoid weakening the central portions of the side walls of the carrier, such as occurs when the notches for the trunnions extend directly from the outer or open side of the carrier to the channel which the trunnions normally occupy.

Practice has demonstrated the necessity for strengthening the notched side walls of open topped carriers as heretofore constructed. Said notched side walls have been exteriorly ribbed in prior constructions. The arrangement of the notches as herein shown avoids the necessity of exteriorly ribbing the side walls of the carrier, thereby making it possible to lighten the carrier, as a whole and making it more compact to occupy less space.

In accordance with another feature of my invention, one of the bearing members is movable relatively to the walls of the carrier and is supported by means permitting it to slightly rock or tilt relatively to the carrier, or to the other bearing member, in such manner that the antifriction member or means will always be presented for proper bearing contact with the upper and lower bearing members at times when weight is being transmitted therethrough, regardless of inaccuracies of adjustment of the upper and lower bearing members or the parts by which they are carried. As shown in Figs. 1 to 3, inclusive, the wear plate or upper bearing member 17 is thus loosely mounted in the carrier. In said Figs. 1 to 3, inclusive, is shown one practical construction and arrangement of the parts which support the bearing member or wear plate on the carrier, permitting a rocking or oscillatory movement of the wear plate for the purpose set forth. As shown in said figures, the plate 34, which is loosely interposed between the filler plate 33 and the wear plate 17, has a flat lower side for engagement with the flat upper side of the wear plate, and is transversely rounded on its upper side to engage a complemental surface on the under side of the filler plate. Thus the wear plate or member 17 is free to rock on its longitudinal axis to adjust itself to the face of the roller or antifriction member. That is to say, the bearing member or wear plate 17 is capable of rocking or oscillating about the longitudinal axis of the wear plate, which axis is transverse to the line contact between the roller 13 (or other similar form of antifriction element) and the wear plate. Thus, if the face of the roller be not presented to the wear plate for accurate engagement therewith throughout its length or line contact, or, if its line contact be out of parallel with the adjacent face of the wear plate, said wear plate is free to rock or oscillate to accurately adjust itself to the roller or other like antifriction element which has a line contact with said wear plate. In Fig. 5 I have shown this feature of my invention applied to a slightly modified form of the bearing. In this construction the wear plate 57 is itself transversely rounded on its upper side to fit a complemental surface on the under side of the filler plate 58 that is arranged to be interposed between the wear plate and the bolster or other support to which the bearing is attached. Preferably, in this construction, the wear plate is convexly rounded to avoid weakening the same. The same general results may be secured by convexly rounding the filler plate 58 in its part which bears against the under side of the bolster or other support and arranging the filler plate loosely within the carrier. Again the wear plate 67 (shown in Fig. 6) may be convexly rounded on its upper side in its part which engages the support to which the carrier is attached and arranged to fit loosely within the open top of the carrier to afford the necessary capacity for rocking or oscillating to adjust itself to the antifriction element. Moreover, the lower bearing member 15 may be loosely mounted on its support to permit it to rock or oscillate for the same purpose. As a means for supporting the bearing members or wear plates, thus loosely mounted in the carrier, said wear plates may extend at their side margins outwardly over upwardly facing parts of the carrier walls. As shown in Figs. 1 to 3, inclusive, the wear plate or bearing member rests on the ribs 40, which latter are depressed such distance below the open top of the carrier as to afford space or room for the wear plate 17, the oscillatory plate 34 and the filler plate 33 of the top wall structure. In the construction shown in Fig. 5, the wear plate 57 rests at its side margins on upwardly facing surfaces 59 of the side walls of the carrier located a suitable distance below the level of the open top of the carrier. The inner margins of the wear plate supporting surfaces are elevated above the main portions thereof, as shown in said figure, so as to permit the intended rocking movement of the plates or bearing members, while supporting them from end to end thereof.

Means are provided, in the construction shown in Figs. 1 to 3, inclusive, for locking the filler plate to the carrier and thereby holding the parts assembled during handling and transportation thereof. As herein shown, the wear plate 17, the rocking member 34 and the filler plate 33 are made of less length than the top wall of the carrier and are longitudinally contained between flanges 60, 60 of the top wall of the carrier, formed by transversely coring out the said top wall near the ends of the carrier. The filler plate 33 is rimmed at its upper side and is attached at its ends to the flanges 60 by means of cotter pins 62 which extend through the flanges 60 and the end rims of the filler plate. As a further improvement I may provide, in an open top bearing of this character, means extending, or bridged, between the side walls of the carrier and interlocked with said side walls thereof in a manner avoiding tendency of the side walls to spread apart. Such feature of construction is especially useful and valuable in an open top bearing in which the side walls of the carrier are notched (and therefore somewhat weakened) for the introduction of the trunnioned antifriction element.

As shown in Figs. 2 and 3, the transversely arranged interlocking means embraces the filler plate 33. It is provided at its side margins with downwardly turned hook shaped flanges 65, 65 which engage upwardly turned, like shaped flanges 66, 66 near the upper margins of the side walls of the carrier.

In Fig. 6 I have shown the interlocking connection occurring between the wear plate 67 itself and the side walls of the carrier. In this construction the wear plate 67 is provided at its edges with down turned hook shaped flanges 68 which engage upwardly directed hook shaped flanges 69 at the sides of the carrier walls near the upper margins thereof. The wear plate shown in Fig. 6 may be a drop forging.

It will be observed that the open top type of the carrier, wherein the antifriction device or member is inserted into the carrier through the open top thereof, and wherein the side walls of the carrier are notched to permit the trunnions to pass into and out of the carrier, the wear plate or bearing member serves, when in place, to hold the antifriction member in the casing. Certain of the features of the invention may, however, be applied to bearings having other means for introducing the antifriction member into the carrier.

The tapered form of the trunnions herein shown possesses general advantages in manufacture and use as follows: Said trunnions are stronger than cylindric trunnions, weight for weight, and being of greatest diameter at their junctions with the ends of the rollers are less liable to crack or break in casting, due to contraction during the cooling of the metal. Moreover, by reason of the fact that the trunnions meet the bodies of the antifriction elements at obtuse angles, or angles greater than a right angle, the surfaces of the trunnions are left smooth in the casting operation, there being little or no tendency to an irregular formation of the trunnion at the angle between the trunnion and end face of the roller or antifriction element, such as is likely to occur when the angles are sharper, as right angles. Such irregular formation of the trunnions, when present, interferes with the proper rolling of the trunnions on the tracks. Moreover, the tapering of the trunnions outwardly, as shown, permits the notches in the side walls of the carrier, through which the trunnions pass when the antifriction element is introduced into and moved from the carrier, to be made smaller, with a result of lessening the weakening of the side walls, due to the presence of such notches. Thus the notches may be made V-shaped.

In the application of the rocking bearing member feature of the invention to a center bearing, embracing a plurality of radially arranged rollers between upper and lower bearing members, the rocking bearing member may be arranged for universal rocking motion to permit it to rock on axes transverse to the planes of all the lines of contact between the rollers and bearing members.

I claim as my invention:—

1. An antifriction bearing comprising upper and lower bearing members, an interposed element through the body of which the load is carried and provided with end bearings or trunnions, and resilient means which act on said trunnions to yieldingly hold the antifriction element engaged with one of the bearing members when it is free from the other bearing member.

2. An antifriction bearing comprising upper and lower bearing members, and an interposed antifriction element arranged to roll along said bearing member and having end bearings or trunnions, the upper bearing member being provided with yielding tracks arranged to engage said trunnions and to yieldingly hold the antifriction element engaged with the upper bearing member when it is free from the lower bearing member.

3. An antifriction bearing comprising upper and lower bearing members, and an interposed antifriction element, one of said members having resilient means to yieldingly hold the antifriction element against one of the bearing members when it is free from the other bearing member, said resilient means tending to automatically return said antifriction element to a predetermined position when free from said other bearing member.

4. An antifriction bearing comprising a carrier provided with a downwardly facing bearing member, an antifriction element in said carrier adapted to roll along said bearing member and provided with end bearings or trunnions, and tracks yieldingly mounted in the carrier along which the trunnions roll, said tracks being arranged to act on said trunnions to yieldingly hold said antifriction element in engagement with said bearing member of the carrier.

5. An antifriction bearing comprising a carrier provided with an elongated downwardly facing bearing member, an antifriction roller in said carrier adapted to roll along said bearing member, and resilient means carried by said carrier and acting upon the ends of said roller to yieldingly hold it engaged with said bearing member.

6. An antifriction bearing comprising a carrier provided at its top wall with a bearing member, said carrier being open at its bottom and provided near its open bottom with flanges or shoulders, track bars within the carrier above said shoulders, springs interposed between said track bars and shoulders, and an antifriction element in said carrier engaging said bearing member and having end bearings or trunnions adapted for engagement with the track bars.

7. An antifriction bearing comprising a carrier provided at its top wall with a bearing member, said carrier being open at its bottom and provided near its open bottom with flanges or shoulders, track bars within the carrier above said shoulders, springs interposed between said tracks and shoulders, and an antifriction element in said carrier engaging said bearing member and having end bearings or trunnions adapted for engagement with the track bars, the end walls of the carrier having parts beneath which the ends of the track bars extend to limit the upward movement of said track bars.

8. An antifriction bearing comprising a carrier provided with a downwardly facing bearing member, an antifriction element in said carrier arranged to roll along said bearing member and provided with end bearings or trunnions, tracks upon which said trunnions rest and roll and arranged to permit the antifriction element to return to a predetermined point in its path of travel, and springs applied to said track to hold the antifriction element in contact with said bearing member and to assist the return or restoring movement of the antifriction element.

9. An antifriction bearing comprising upper and lower bearing members and supports therefor, an antifriction element interposed between and arranged to roll along said bearing members, said antifriction element having end bearings or trunnions, and tracks upon which said trunnions rest and roll when the antifriction element is released from contact with one of said bearing members, one of said bearing members having rocking movement relative to its support.

10. An antifriction bearing comprising an upper and a lower bearing member, an antifriction element interposed between the same for line contact with said bearing members, one of the bearing members being arranged to oscillate relatively to its support, and a rocking member loosely interposed between said oscillatory bearing member and its support and being transversely rounded for engagement with the adjacent side of one of the parts between which it is interposed.

11. An antifriction bearing comprising a carrier provided at its top with an elongated bearing member arranged to rock or oscillate about its longitudinal axis relative to the carrier body, and antifriction means mounted in the carrier adapted for contact with said bearing member.

12. An antifriction bearing comprising a carrier, antifriction means mounted therein having end bearings or trunnions, tracks on the carrier adapted to engage said trunnions, and an elongated bearing member mounted in the wall of the carrier to have a rocking or oscillatory movement about its longitudinal axis relatively to the carrier.

13. An antifriction bearing comprising a casing or support, an antifriction element, a bearing member loosely mounted relatively to the carrier or support for engagement with the antifriction element, a filler plate in the carrier or support, and a rocking member loosely mounted between the filler plate and said bearing member.

14. An antifriction bearing comprising a carrier open at its top and provided with tracks, an antifriction element in the carrier having end bearings or trunnions engaging said tracks, a bearing member loosely mounted in the carrier for engagement with the antifriction element, a filler plate in the open top of the carrier, and a rocking member loosely mounted between the filler plate and said bearing member.

15. An antifriction bearing comprising a carrier, antifriction means in said carrier, a bearing member loosely mounted in the carrier for engagement with the antifriction means, a filler plate in the carrier, and a rocking member loosely mounted between the filler plate and said bearing member, said rocking member being rounded and the filler plate being complementally formed to engage the rounded rocking member.

16. An antifriction bearing comprising a carrier open at its top and provided with tracks, antifriction means in the carrier having end bearings or trunnions engaging said tracks, a bearing member loosely mounted in the carrier for engagement with the antifriction element, a filler plate in the open top of the carrier, a rocking member loosely mounted between the filler plate and said bearing member, and means for fastening the filler plate to the carrier.

17. An antifriction bearing comprising an open topped carrier, an antifriction element provided with end bearings or trunnions and adapted to be inserted into the carrier through its open top, and tracks in the carrier adapted for engagement by said trunnions, the walls of the carrier having oppositely disposed notches providing oppositely disposed passage ways extending indirectly from the open side of the carrier to the tracks through which said trunnions are adapted to pass.

18. An antifriction bearing comprising an open topped carrier, an antifriction element adapted to be inserted into the carrier through its open top and provided with end bearings or trunnions, tracks in the carrier adapted for engagement by said trunnions, the walls of the carrier having pairs of oppositely disposed notches to permit the trunnions to pass from the open side of the carrier to the tracks, the upper or receiving ends of one pair of said notches being offset from the inner ends of the other pair of notches.

19. An antifriction bearing comprising an open topped carrier, an antifriction element adapted to be inserted into the carrier through its open top and provided with end bearings or trunnions, tracks in the carrier adapted for engagement by said trunnions, the walls of the carrier having pairs of oppositely disposed notches to permit the trunnions to pass from the open side of the carrier to the tracks, one pair of said notches being offset with respect to the other pair, and the notches of each pair being connected by a transverse connecting passage.

20. An antifriction bearing comprising an open topped carrier, an antifriction element provided with end bearings or trunnins and adapted to be inserted into the carrier through its open top, tracks in the carrier adapted for engagement by said trunnions, the walls of the carrier having pairs of oppositely disposed notches providing oppositely disposed passageways from the open side of the carrier to the track through which said trunnions are adapted to pass, the outer ends of one pair of said notches being offset from the inner ends of the other pair, and a member removably mounted in the carrier to furnish a tread for the antifriction element and to lock the said antifriction element against displacement from the carrier.

21. An antifriction bearing comprising a carrier open at its top and bottom, an antifriction element provided with end bearings or trunnions and adapted to be inserted into the carrier through the open top thereof and to extend through the open bottom of the carrier for contact with a lower bearing member, tracks in the carrier adapted for engagement by said trunnions, upper and lower strengthening ribs made integral with the inner sides of the side walls of the carrier, the said ribs being provided with notches through which said trunnions are adapted to pass, the notches of the upper ribs being out of line with those of the lower ribs, and a member removably mounted on the carrier to furnish an upper tread for the antifriction element.

22. An antifriction bearing comprising a carrier open at its top and bottom and provided at the upper margins of its side walls with locking flanges, an antifriction element in said carrier which projects through the open bottom thereof for contact with a lower bearing member, a bearing member in the carrier adapted for engagement with said antifriction element, and a top wall inclosing the open top of said carrier and provided with depending flanges adapted to engage the locking flanges on the side walls to prevent said walls from spreading apart.

23. An antifriction bearing comprising a carrier open at its top and bottom and provided at its side walls with trunnion receiving notches and with tracks, an antifriction element adapted to be inserted into the carrier through its open top and to extend through the open bottom for contact with a lower bearing member and having end bearings which pass through said notches to said tracks, and means within the carrier removably interlocked with the upper marginal parts of the side walls of the carrier to prevent spreading apart of said side walls.

24. An antifriction bearing comprising a carrier open at its top and provided with tracks, an antifriction element in the carrier having end bearings or trunnions engaging said tracks, a bearing member loosely mounted in the carrier for engagement with the antifriction member, a filler plate in the open top of the carrier, and a rocking member loosely mounted between the filler plate and said bearing member, said filler plate having interlocking engagement with the side walls of the carrier at the open side thereof to prevent spreading apart of said side walls.

25. An antifriction bearing comprising a carrier which is open at its top and bottom and provided with tracks, an antifriction element in said carrier arranged to project through the open bottom of the carrier and provided with conical trunnions adapted to rest and roll on said tracks, the side walls of the carrier being provided with downwardly opening V-shaped notches through which the trunnions are adapted to pass to said tracks, and a member movably fixed in said carrier and adapted to furnish an upper tread for the antifriction element.

26. An antifriction bearing comprising a carrier which is open at its top and bottom and provided with tracks, an antifriction element in said carrier arranged to project through the open bottom of the carrier and provided with conical trunnions adapted to rest and roll on said tracks, the side walls of the carrier being provided with downwardly opening notches through which the trunnions are adapted to pass to said tracks, and a member confined in said carrier and adapted to furnish an upper tread for the antifriction element, said member being movable about an axis at right angles to its line of contact with said antifriction element whereby it fully contacts with said antifriction element at all times when in engagement with it.

27. An antifriction bearing comprising upper and lower bearing members, an interposed antifriction element, and resilient means carried by one of said bearing members tending to simultaneously return said antifriction element to a predetermined point and to lock it against vertical movement.

In testimony, that I claim the foregoing as my invention I affix my signature in the presence of two witnesses, this 3rd day of December A. D. 1908.

EDWIN S. WOODS.

Witnesses:
G. R. Wilkins,
T. H. Alfreds.